(12) United States Patent
Pari et al.

(10) Patent No.: US 9,395,723 B2
(45) Date of Patent: Jul. 19, 2016

(54) SELF-PROPELLED ROBOT ASSISTANT

(71) Applicant: FIVE ELEMENTS ROBOTICS, INC., Wall Township, NJ (US)

(72) Inventors: James Pari, Wall Township, NJ (US); Nicholas Lynch, Wall Township, NJ (US)

(73) Assignee: FIVE ELEMENTS ROBOTICS, INC., Wall, NJ (US)

( * ) Notice: Subject to any disclaimer, the term of this patent is extended or adjusted under 35 U.S.C. 154(b) by 68 days.

(21) Appl. No.: 14/041,901

(22) Filed: Sep. 30, 2013

(65) Prior Publication Data

US 2015/0094879 A1   Apr. 2, 2015

(51) Int. Cl.
| | |
|---|---|
| *G05D 1/12* | (2006.01) |
| *B25J 9/00* | (2006.01) |
| *G05D 1/00* | (2006.01) |
| *B25J 11/00* | (2006.01) |
| *B25J 5/00* | (2006.01) |
| *G05D 1/02* | (2006.01) |

(52) U.S. Cl.
CPC .............. *G05D 1/0022* (2013.01); *B25J 5/007* (2013.01); *B25J 11/008* (2013.01); *G05D 1/0276* (2013.01); *G05D 1/12* (2013.01); *G05D 2201/0206* (2013.01); *Y10S 901/01* (2013.01)

(58) Field of Classification Search
USPC .......................................................... 701/2
See application file for complete search history.

(56) References Cited

U.S. PATENT DOCUMENTS

| | | | |
|---|---|---|---|
| 5,001,635 A | 3/1991 | Yasutomi et al. | |
| 5,526,321 A | 6/1996 | Kim | |
| 5,940,346 A | 8/1999 | Sadowsky et al. | |
| 6,760,647 B2 | 7/2004 | Nourbakhsh et al. | |
| 6,816,437 B1 | 11/2004 | Teller et al. | |
| 7,228,203 B2 | 6/2007 | Koselka et al. | |
| 7,554,282 B2 * | 6/2009 | Nakamoto | B25J 5/00 318/587 |
| 7,818,090 B2 * | 10/2010 | Okamoto | G05D 1/0272 700/253 |
| 8,229,618 B2 | 7/2012 | Tolstedt et al. | |
| 8,270,632 B2 | 9/2012 | Hwang et al. | |
| 8,359,122 B2 | 1/2013 | Koselka et al. | |
| 8,392,065 B2 | 3/2013 | Tolstedt et al. | |
| 8,403,105 B2 | 3/2013 | Lee et al. | |
| 8,634,955 B2 * | 1/2014 | Oaki | G05D 1/0227 15/320 |

(Continued)

FOREIGN PATENT DOCUMENTS

KR   101202398 B1 * 11/2012

*Primary Examiner* — Shelley Chen

(74) *Attorney, Agent, or Firm* — Patterson & Sheridan, LLP

(57) ABSTRACT

A self-propelled robot and method for operating the same are provided. The self-propelled robot includes a base, a drive motor, a communication transceiver, at least two laterally spaced-apart range finding sensors and a processor. The base defines a bottom of a payload receiving space. The drive motor is operable to propel the base across a surface. The communication transceiver is configured to communicate with a carry sensor that is remote from the robot. The range finding sensors are configured to provide range information indicative of a distance between the remote device and the range finding sensors. The processor is configured to, when communication transceiver is in communication with the remote device, operate the drive motor to maintain a predefined distance between the range finding sensor and the carry sensor.

17 Claims, 9 Drawing Sheets

(56) References Cited

U.S. PATENT DOCUMENTS

| | | | |
|---|---|---|---|
| 2003/0216834 A1* | 11/2003 | Allard | B25J 9/1689 700/245 |
| 2004/0085222 A1* | 5/2004 | Yoshikawa | G05D 1/0246 340/12.22 |
| 2004/0169736 A1* | 9/2004 | Rakvica | H04N 1/00326 348/222.1 |
| 2007/0159311 A1* | 7/2007 | Schober | B60Q 1/525 340/435 |
| 2008/0079383 A1* | 4/2008 | Nakamoto | B25J 5/00 318/587 |
| 2008/0179115 A1* | 7/2008 | Ohm | B25J 5/005 180/9.21 |
| 2009/0024250 A1* | 1/2009 | Oaki | G05D 1/0227 700/245 |
| 2010/0116566 A1* | 5/2010 | Ohm | B25J 5/005 180/8.2 |
| 2010/0263948 A1* | 10/2010 | Couture | B25J 5/005 180/8.2 |
| 2011/0026770 A1* | 2/2011 | Brookshire | G05D 1/0251 382/103 |
| 2013/0070068 A1* | 3/2013 | Garvey, III | G01C 15/00 348/61 |
| 2013/0162461 A1* | 6/2013 | Lucking | G01S 15/878 342/70 |

* cited by examiner

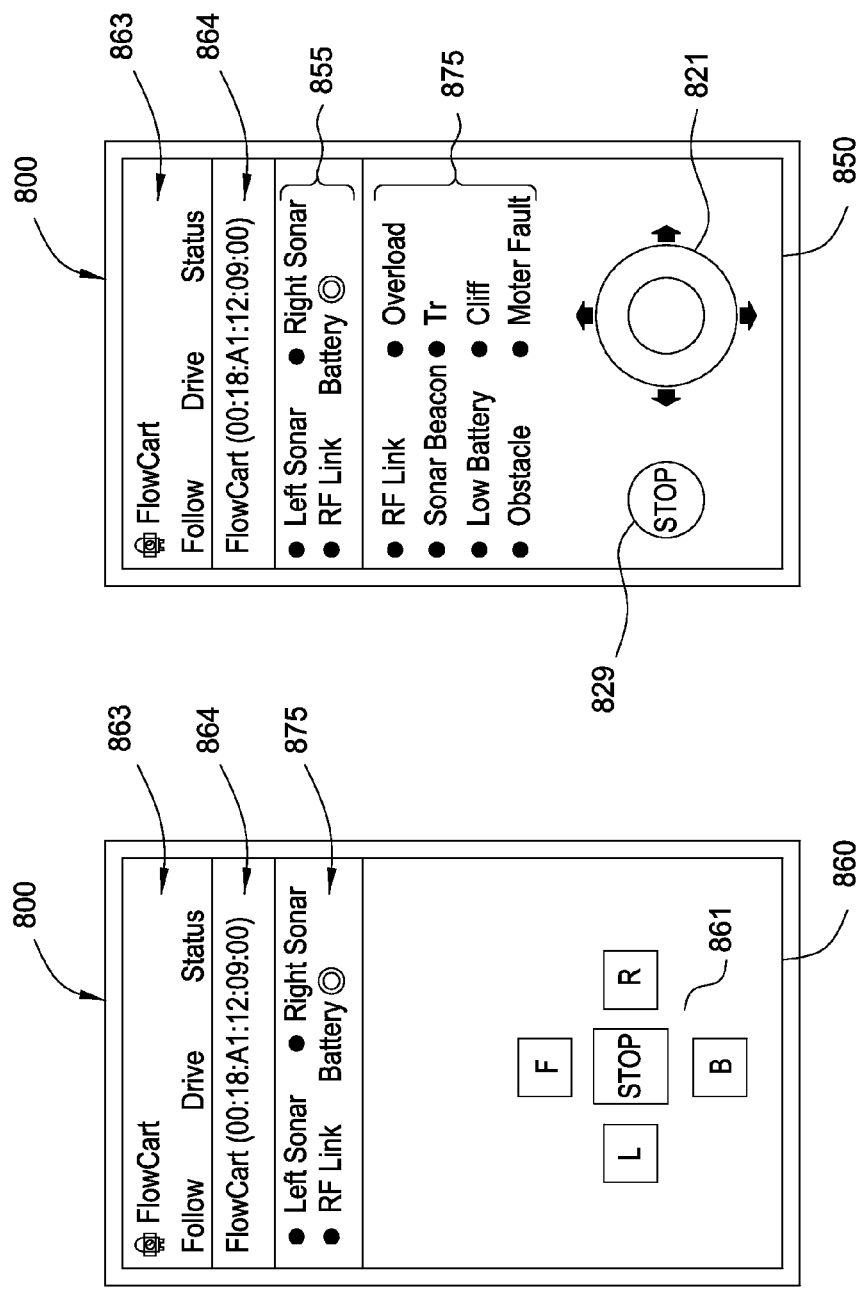

SELF-PROPELLED ROBOT ASSISTANT

BACKGROUND OF THE INVENTION

1. Field of the Invention

The present invention generally relates to a robotic device and more particularly, to the design for a robot.

2. Description of the Related Art

Industrial robots have been employed for decades to automate repetitive manufacturing tasks, such as welding among others. Industrial robots are also used to deliver components or move workpieces on assembly lines. Robots are only now being developed for consumer use. For example, robotic vacuums, robotic lawn mowers, surveillance robots and companion robots are now available to the public. The Applicants have identified a need for a consumer robot that can assist in toting items, for example, within a work place, around the home or in a shopping environment. However, industrial robots typically utilized to deliver components or move workpieces in a factory setting are inadequate for navigating outside of the factory setting where the robot typically follows a painted line on a floor and are programmed to move between predefined destinations. Additionally, outdoor robots, such as lawn mower or even robotically driven vehicles are also inadequate for navigating in areas crowded with obstacles and moving people. Moreover, none of the aforementioned robotic systems are configured to interact with a specific person while that person is performing tasks unrelated to the robot.

Therefore, there is a need for an improved robot which can provide hand and attention-free assistance to a user.

SUMMARY OF THE INVENTION

A self-propelled robot and method for operating the same are provided. In one embodiment, the self-propelled robot includes a base, a drive motor, a communication transceiver, at least two laterally spaced-apart range finding sensors and a processor. The base defines a bottom of a payload receiving space. The drive motor is operable to propel the base across a surface. The communication transceiver is configured to communicate with a carry sensor that is remote from the robot. The range finding sensors are configured to provide range information indicative of a distance between the remote device and the range finding sensors. The processor is configured to, when communication transceiver is in communication with the remote device, operate the drive motor to maintain a predefined distance between the range finding sensor and the carry sensor.

In another embodiment, a self-propelled robot includes a base, a head, a neck, at least one drive motor, a communication transceiver, a container assembly and a processor. The head has at least two laterally spaced-apart range finding sensors. The neck couples to the head the base. The neck is movable to space the head away from the base when in an erect position and movable to space the head proximate the base when in a collapsed position. The at least one drive motor is operable to propel the base across a surface. The communication transceiver is configured to communicate with a carry sensor that is remote from the robot. The container assembly is supported between the head and the base. The processor is configured to, when communication transceiver is in communication with the remote device, operate the drive motor to maintain a predefined distance between the range finding sensor and the carry sensor.

In yet another embodiment, a method for operating a robot is provided. The method includes electronically pairing a transceiver of the robot with an carry sensor disposed on a user, determining a distance to the user with a range finder mounted on the robot, and autonomously following the user when communication transceiver is in communication with the carry sensor while maintaining a predefined distance between the range finding sensor and the carry sensor.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIGS. 8A-8E illustrate various screens of a computing device provided as an example of a user interface for operating the robot of FIG. 1.

To facilitate understanding, identical reference numerals have been used, where possible, to designate identical elements that are common to the figures.

DETAILED DESCRIPTION

A self-propelled robot is provided which is designed to safely follow a human user in a variety of environments that are not modified to accommodate the robot. Additionally, the robot is designed to carry a payload of up to 50 lbs. (22.7 kg) The robot is also of a size and weight that the robot may be lifted by an adult with normal strength; fits into the trunk of a standard car; alerts the user when the robot is unable to find him or her; and is simple and intuitive to operate. The robot is configured to be paired with a carry sensor carried by a user. The carry sensor is small and light weight so it may be easily and non-intrusively carried on the user's person while the user is performing other activities. Thus, the self-propelled robot functions as an ever-nearby assistant to the user even while the user's attention is directed to other activities.

Figure 1:
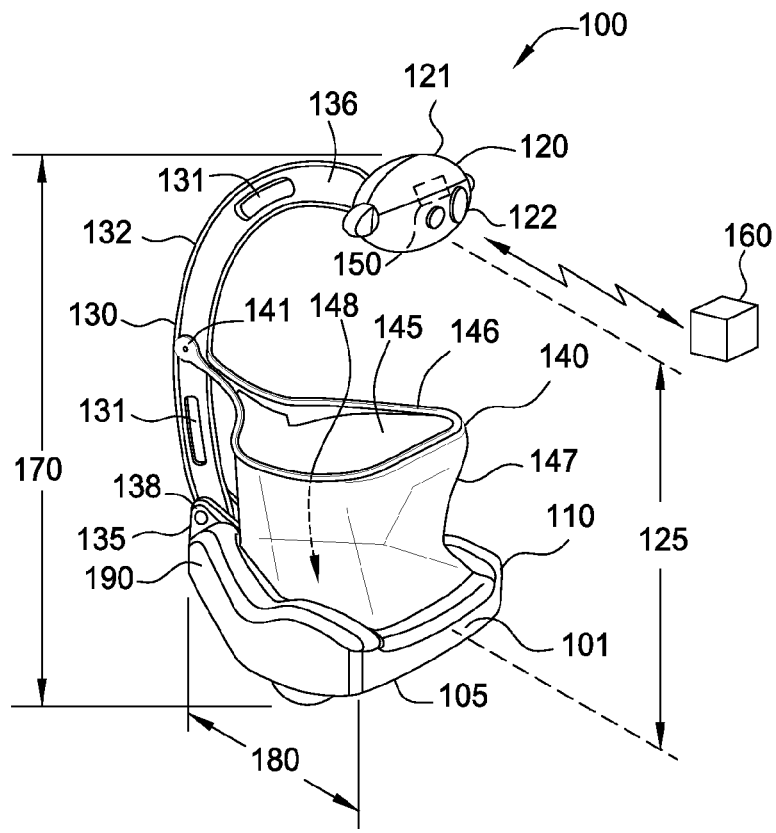
FIG. 1 is an illustration of a robot, according to an embodiment.

FIG. 1 illustrates a self-propelled robot 100, according to an embodiment. At least in one mode, the robot 100 is configured to operate and move independently of any external support or influence other than provided by sensors on board the robot 100. The robot 100 includes a base 110, a curved neck 130 a head 120 and a container assembly 140. The robot 100 is configured to be free-standing on the base 110. The base 110 includes a body (described further below) that may be covered with a cowling 190 to hide operational components of the robot 100 positioned in the base 110. The base 110 is sufficiently stable to support the curved neck 130 which supports the head 120, as well as additional weight. The stability of the robot 100 may be adjustable. For instance, weight in the neck 130, base 110 or head 120 may be adjusted to move the center of gravity for the robot 100 closer to the ground. A processor 150, shown in phantom in FIG. 1, may be disposed in the base 110 or head 120 of the robot 100, and is configured to control the operation of the robot 100, along with providing an interface for communicating with a carry sensor 160 carried by the user. Details of the carry sensor 160 are described further below.

The robot 100 is shown in an erect position in FIG. 1. In the erect position, the robot 100 has a top 121 and a bottom 105. The bottom 105 contacts a surface, such as ground or a floor of a building, upon which the robot 100 operates. The distance between the top 121 and the bottom 105 defines an overall height 170 of the robot 100. The overall height 170 of the robot may be about 1.0 m to about 1.2 m. In one embodiment, the overall height 170 of the robot 100 is about 1.09 m.

The base 110 of the robot 100 has a front 101 which faces the primary direction the robot 100 is designed to travel. In other words, the front 101 is the surface of the robot 100 approaching obstacles when the robot 100 is moving in a forward direction. Conversely, the base 110 of the robot 100 has a rear 132 located on the opposite side of the base 100 relative to the front 101 of the robot 100. The distance between the front 101 and the rear 132 of the robot 100 when the robot 100 is in the erect position is defined by a length 180. The length 180 of the robot 100 may be about 0.65 m to about 0.85 m. In one embodiment, an overall width of the robot 100, e.g., the dimension of the robot 100 perpendicular to the length 180, is about 0.755 m.

Figure 3:
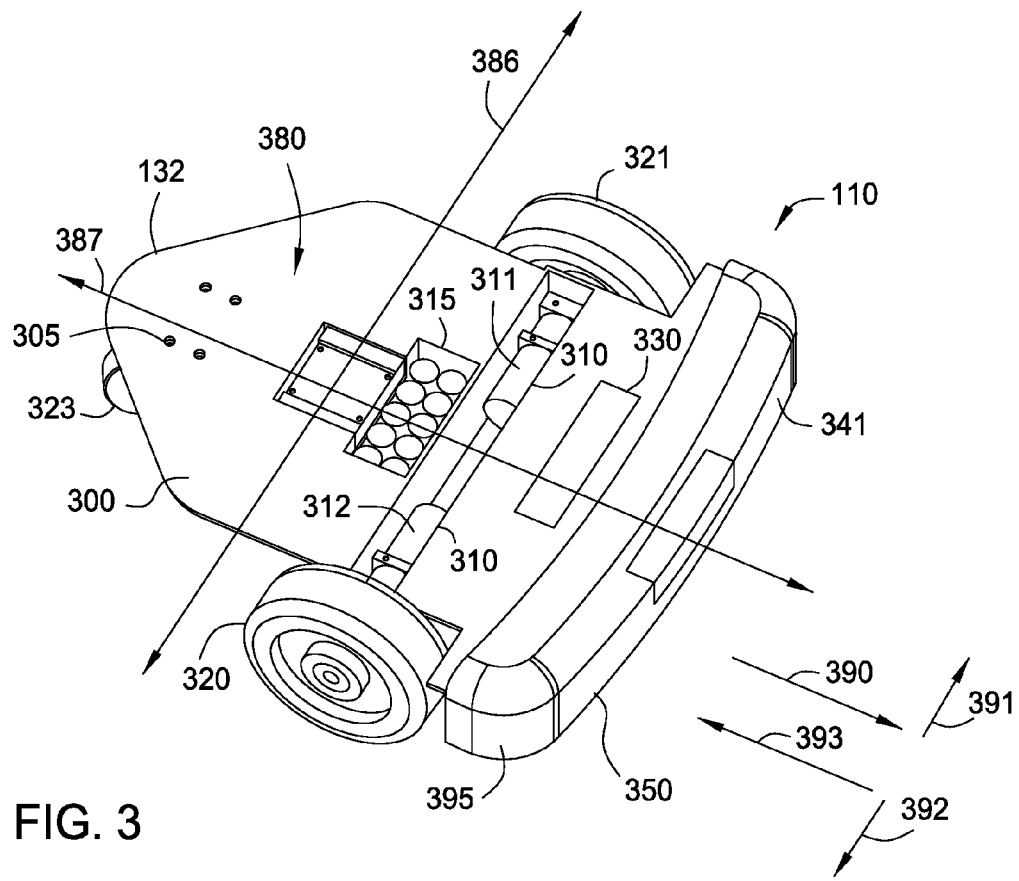
FIG. 3 is an illustration of a body for the base of the robot, according to an embodiment.

FIG. 3 is a perspective view of the base 110 of the robot 100 with the cowling 190 removed to reveal a body 300 of the base 110. The body 300 may be polygonal and formed from materials comprising metals, plastics, polyester, carbon, wood or other suitable materials. Additionally, polygon shape of the body 300 may be square, rectangular, triangular, pentagonal or other suitable shape. The body 300 has a top surface 380, an outer edge 395 and a bumper 341. The body 300 also includes one or more drive wheels and/or one or more caster wheels. In one embodiment, the body 300 includes two drive wheels 321, 320 and a single pivotal caster wheel 323. The two drive wheels 321, 320 and caster wheel 323 may be mounted to the body 300 in any suitable location, and in the embodiment depicted in FIG. 3, the drive wheels 321, 320 are coupled to the body 300 proximate to the front 101 of the base 110, while the pivotal caster wheel 323 is coupled to the body 300 proximate to the rear 132 of the base 110. A motor, or other actuator, may cause one or more of the drive and/or castor wheels to rotate in a manner that propels the robot 100 in a desired direction. In the embodiment depicted in FIG. 3, motors 311, 312 are respectively coupled to the drive wheels 321, 320. The motors 311, 312 may drive the rotation of both drive wheels 321, 320 equally to cause the body 300, and hence the robot 100, to move in a direction perpendicular to the axis of the drive wheels 321, 320, while driving the wheels 321, 320 differently will cause the body 300 travel in a curved path or rotate on a vertical axis. Alternately, a motor may be used to cause the caster wheel 323 to rotate and thus propel the robot 100 along a desired path. In an alternate embodiment, the body 300 includes three or more caster wheels, similar to caster wheel 323, but wherein one or more of the caster wheels is driven by the motor to control the rotation of the wheel. A second motor may be utilized to control the pivot direction of the caster wheel 323 to facilitate steering.

The body 300 may house a drive unit 310 for controlling the rotation of the motors 311, 312 and propelling the robot 100. The drive unit 310 may include one or more motors 311, 312 coupled to a power source 315. The power source 315 may be batteries, capacitors, solar, chemicals or other suitable energy storage devices for providing power to the motors 311, 312. In one embodiment, the motors 312, 311 may couple directly to the drive wheels 320, 320. In an alternate embodiment, the motors 312, 311 may couple to the drive wheels 320, 320 via a linkage or gearbox. In another embodiment, a single motor may couple to both the drive wheels 320, 321 via a linkage or gearbox that independently regulates the power provided to each drive wheel 320, 321. In yet another embodiment, a single motor supplies power to a caster wheel and a steering assembly controls the direction of movement for the robot 100.

In one embodiment, the drive unit 310 controls the motors 311, 312 that drive the drive wheels 321, 320 to control the propulsion of the robot 100. For example, the motor 311 may be coupled to the drive wheel 321 and the motor 312 may be coupled to the drive wheel 320. The drive unit 310 provides power to the motor 311 to selectively rotate drive wheel 321 in either a counter clockwise (CCW) direction or clockwise (CW) direction. The drive unit 310 also provides power to the motor 312 to selectively rotate drive wheel 320 in either the CCW direction or the CW direction. By selecting the direction and speed to respectively drive the drive wheels 320, 321, the robot 100 can be controllably moved forward or reverse in a straight path, moved forward or reverse in a curved path, spun on the robots axis, or any combination of the aforementioned motions.

The body 300 also includes a sensor package which is interfaced with the processor 150 of the robot 100. The sensor package provides information utilized by the processor 150 to control of operation of the robot 100. The sensor package may include, but is not limited to, a bump sensor 340, a tilt sensor 330 and a cliff sensor 350. The bump sensor 340 is utilized to detect objects in the forward path of the robot 100. The bump sensor 340 may be located in any suitable location, and in the embodiment depicted in FIG. 3, the bump sensor 340 is located in the bumper 341 near the front 101 of the robot 100. The bump sensor 340 may be a proximity sensor or other sensor suitable for detecting objects in the forward path of the robot 100. The bump sensor 340 provides a signal to the processor 150 indicating the presence of an object in the forward path so that the processor 150 may take appropriate action, such as stopping the forward motion of the robot 100. The bump sensor 340 (or additional bump sensors 340) may be extended positioned along a perimeter of the body 300 to offer 360 degrees of object presence sensing around the robot 100 to allow for the robot 100 to avoid objects when reversing direction or turning.

The bump sensor 340 may incorporate sensing technology such as a RADAR, image processing, an optical triangulation sensor, a mechanical switch, infrared, or other suitable technology for sensing the proximity or presence of an object. In one embodiment, the bump sensor 340 may be an active infrared (IR) bump sensor 340. The bump sensor 340 may use fields, beams, or detectable changes in ambient conditions to allow sensing of objects within a usable range. For example, if an object breaks the IR beam from the bump sensor 340 located in the bumper 341, the robot 100 may go into an emergency stop state which stops the motion of the robot 100.

When in emergency stop state, the robot 100 may become inactive or temporality inactive. In one embodiment, upon the bump sensor 340 detecting an object and placing the robot 100 in an emergency stop state, the robot 100 may be configured to not take any action to free itself of the perceived obstacle. In an alternate embodiment, upon the bump sensor 340 detecting an object and placing the robot 100 in an avoidance state, the robot 100 may reverse a direction, rotate or otherwise navigate a path around the object.

The tilt sensor 330 is utilized to provide the processor 150 with information regarding how much the robot 100 is inclined from vertical. The tilt sensor 330 may be disposed in or on the body 300, the neck 130, the head 120, or other suitable location of the robot 100. In embodiment shown in FIG. 3, the tilt sensor 330 is disposed within the body 300. The tilt sensor 330 provides a signal indicative of an angle of tilt of the robot 100 relative to either a horizontal or vertical reference plane. The tilt sensor 330 may be an inclinometer with sensing elements utilizing liquid capacitive, electrolytic, gas bubble in liquid, or a pendulum, among others. In one embodiment, the tilt sensor 330 uses a accelerometer to determine the inclination of the robot 100.

The processor 150 may have one or more configurable parameters which provide an operational window to which the data from the tilt sensor 330 is compared. The processor 150 may store configurable information defining the operational window for the maximum angle of tilt for the measured axis 386, 387. The maximum angle of tilt in each measured axis 386, 387 may be different. For example, a center of gravity for the robot 100 may be different in the two measured axis 386, 387 due to the configuration (irregular base 110 and/or wheel locations) and/or loading of the robot 100. A tipping point may be determined when a normal (vertical) projection for the center of gravity for the robot 100 is beyond the outer edge 395 of the body 300 and contacts the ground. A safe operating angle may be determined by applying a safety factor to an angle for the tipping point in each of the axis 386, 387. In one embodiment, the safe operating angle may be about 20 degrees in the y-axis 386 and 20 degrees in the x-axis 387. The safe operating angles may be used to set the maximum safe operating range of tilt for the robot 100. When the angle of tilt, as detected by the tilt sensor 330, exceeds the maximum safe operational range, the robot 100 may enter the emergency stop state.

The cliff sensor 350 is utilized to detect a discontinuity of the surface on which the robot 100 is traveling over. The processor 150, utilizing information provided by the cliff sensor 350 relating to the discontinuity, determines if the robot 100 will be able to traverse the surface discontinuity. The cliff sensor 350 may be disposed in or on the body 300, the neck 130, the head 120, or other suitable location on the robot 100. Suitable locations may include those positions wherein the cliff sensor 350 can clearly detect surface discontinuities in the direction the robot 100 is moving. In one embodiment, the cliff sensor 350 is located in the bumper 341 of the body 300. The cliff sensor 350 may be configured to detect surface discontinuities such as curbs, steps, holes, and gaps in the surface ahead of the robot 100 so that the processor 150 may determine if these surface discontinuities are traversable by the robot 100.

The cliff sensor 350 may be a proximity sensor. The cliff sensor 350 may incorporate sensing technology such as RADAR, LiDAR, an air gap capacitive, video image processor, an optical triangulation sensor, infrared, or other suitable technology for sensing a surface discontinuity in a surface. In one embodiment, the cliff sensor 350 is an infrared proximity sensor. The cliff sensor 350 may be configured to provide a metric from which the processor 150 may determine the size of the discontinuity in the surface by comparing the sensed geometry for the surface discontinuities to an acceptable value for which the robot 100 may traverse. For example, the cliff sensor 350 may be positioned to detect surface discontinuities such as a gap, like that encountered when entering an elevator, a cliff, like that when encountering a curb, or an abruptly raised surface, that that when encountering the edge of a flight of stairs. If the surface discontinuities are outside of the configurable limit associated with the type of discontinuity for which the robot 100 may traverse, the robot 100 will enter the emergency stop or avoidance state.

Terrain features, such as stairs or curbs that are higher than a predetermined acceptable obstacle height, may be perceived as an obstacle by the bump sensor 340. Thus, the processor 150 is configured to determine the type of terrain feature utilizing both the bump sensor 340 and cliff sensor 350 prior to determining if entering an emergency stop or avoidance state is desirable.

Returning to FIG. 1 and FIG. 2, the neck 130 of the robot 100 includes one or more handles 131, a top hinge 136, a bottom hinge 135, and a container attachment 141. The neck 130 is coupled to the base 110 by the bottom hinge 135 and to the head 120 by the top hinge 136. The neck 130 is configured to pivot (as shown by arrow 201) about the bottom hinge 135 to collapse the robot 100 between an erect position as shown in FIG. 1 and a collapsed position as shown in FIG. 2. The head 120 may be pivoted relative to the neck 130 via the top hinge 136 to further reduce the size of the robot 100 in the collapsed position and/or to adjust the angle of the head 120 to more effectively position the sensors mounted thereon, as further described below. The top and bottom hinges 135, 136 may be a pin, spring hinge, locking hinge or other suitable hinge for pivoting the neck between the collapsed position and the erect position. In one embodiment, the bottom hinge 135 includes a male portion formed in the neck 130 configured to engage with a female portion formed in the base 110. In another embodiment, the bottom hinge 135 includes a male portion formed in the base 110 configured to engage with a female portion formed in the neck 130. A hole may be formed through the male portion and the female portion which align when the when the male portion is inserted into the female portion allowing a pin to be placed therethrough. The neck 130 pivots about the pin between the erect and collapsed position.

The top hinge 136 may be substantially similar to bottom hinge 135. In one embodiment, the neck 130 has a top hinge 136 which allows the head 120 to pivot on the neck 130. The head 120 may pivot in a vertical direction, a horizontal direction or both, such as a ball hinge or gimble. Alternately, the neck 130 may not have the top hinge 136 and the head 120 may be fixed to the neck 130. the head 120 may face downward in the collapsed position instead of facing in a forward, as shown in FIG. 2. In one embodiment, the head 120 may also be pivoted relative to the neck 130 to adjust the field of view of the sensors positioned on the head 120.

As the bottom of the neck 130 is coupled to the rear 132 of the body 300, the neck 130 may be curved so as to position the head 120 closer to the front 101 of the robot 100 so that sensors within the head 120 are not obstructed by the robot 100 or it's payload. The curvature of the neck 130 may be selected to allow the container assembly 140 to remain substantially centered over the body 300, thereby enhancing the stability of the robot 100.

The robot 100 may be configured to operate in either the erect or collapsed position, or any position therebetween. Optionally, moving the robot 100 from the erect position may cause the processor 150 to enter a wait state. Returning the robot 100 to the erect position may trigger the robot 100 to enter a ready state.

In the collapsed position, the robot 100 includes a height 270 which is substantially less than a height 170 of the robot 100 in the erect position. The height 170 of the robot 100 in the erect position may be about 1.0 m to about 1.2 m. In one embodiment, the height 170 of the robot 100 in the erect position is about 1.09 m. As the robot 100 is placed into the collapsed position, the height 270 of the robot 100 may be about 0.4 m to about 0.5 m. In one embodiment, the height 270 of the robot 100 in the collapsed position is about 0.46 m. The ability to collapse the robot 100 provides ease of transport and more opportunities for storage. Additionally, when in the collapsed state the handles 131 may provide a convenient means for carrying the robot 100.

In the collapsed position, the robot 100 includes a length 280 which may be slightly greater than the length 180 of the robot 100 in the erect position. The length 180 of the robot 100 in an erect position may be about 0.65 m to about 0.85 m. In one embodiment, the length 180 of the robot 100 in the erect position is about 0.755 m. In contrast, the length 280 of the robot 100 may be about 0.50 m to about 0.70 m when in the collapsed position. In one embodiment, the length 280 of the robot 100 in the collapsed position is about 0.60 m. The length 280 of the robot 100 may be reduced by further folding the robot 100 when it is in the collapsed position. For example, a fourth hinge may be incorporated into the neck 130 design allowing the neck 130 to fold in half upon itself.

A locking mechanism 138 may also be included with the top and bottom hinges 135, 136. The locking mechanism 138 may secure the neck 130 in either the erect position, or the collapsed position. The locking mechanism 138 may be in the form of a pawl tab, lynch pin, slide bolt lock or other suitable mechanism that prevent inadvertent rotation of the neck 130 in the hinges 135, 136. In one embodiment, the locking mechanism 138 is part of the bottom hinge 135. A post or tube may be retracted from a catch in the bottom hinge 135 to allow the bottom hinge 135 to pivot freely about the pin. In another embodiment, the locking mechanism 138 may be separately formed in the neck 130 and/or base 110. For example, the locking mechanism 138 may be a spring clip disposed in and protruding from the male portion of either the neck 130 or base 110. The spring clip may have a small male portion configured to fit into a receiving portion in the female portion. Pressing the male portion of the spring clip such that it is no longer in the receiving portion allows the bottom hinge 135 to pivot about the pin. In yet another embodiment, the locking mechanism 138 may include a formed lip in a receiving notch. Wherein the lip may be engaged with the receiver and disengaged by applying a small force to separate the lip from the receiver.

In one embodiment, the robot 100 may be moveable from the collapsed position to the erect position by lifting the neck 130 away from the base 110 by way of the handle 131 until the robot 100 is fully erect. The locking mechanism 138 may be disengaged prior to moving the neck 130 and reengaged when the neck 130 is in either the collapsed or the erect position.

Figure 2A:
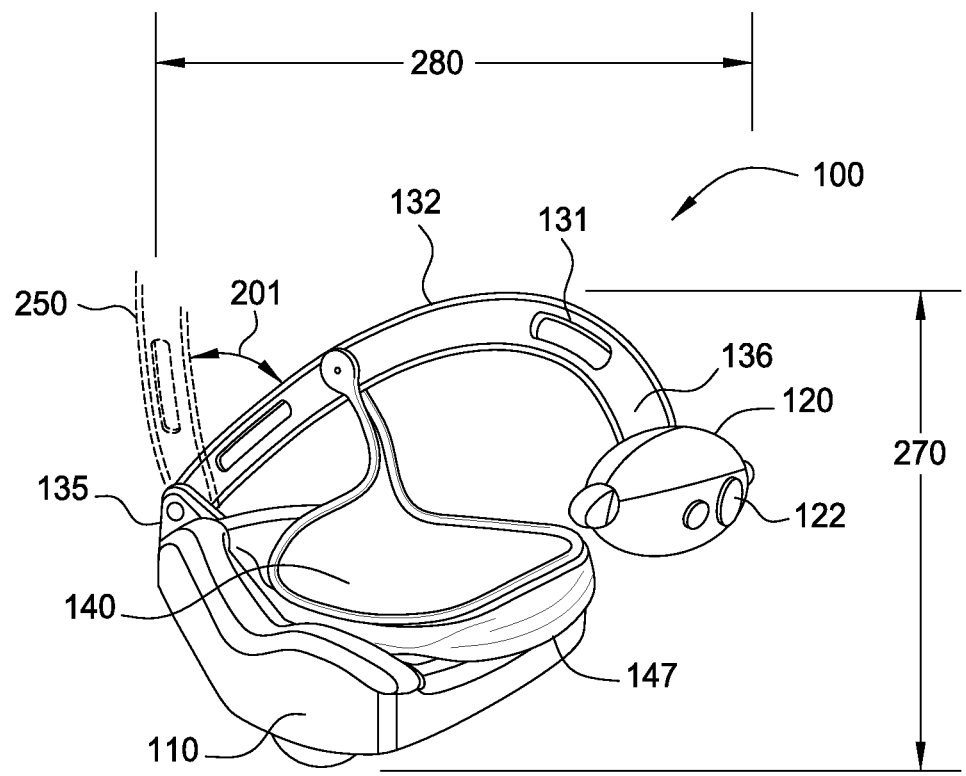
FIG. 2A is an illustration of the robot in a collapsed position, according to an embodiment.
Figure 2B:
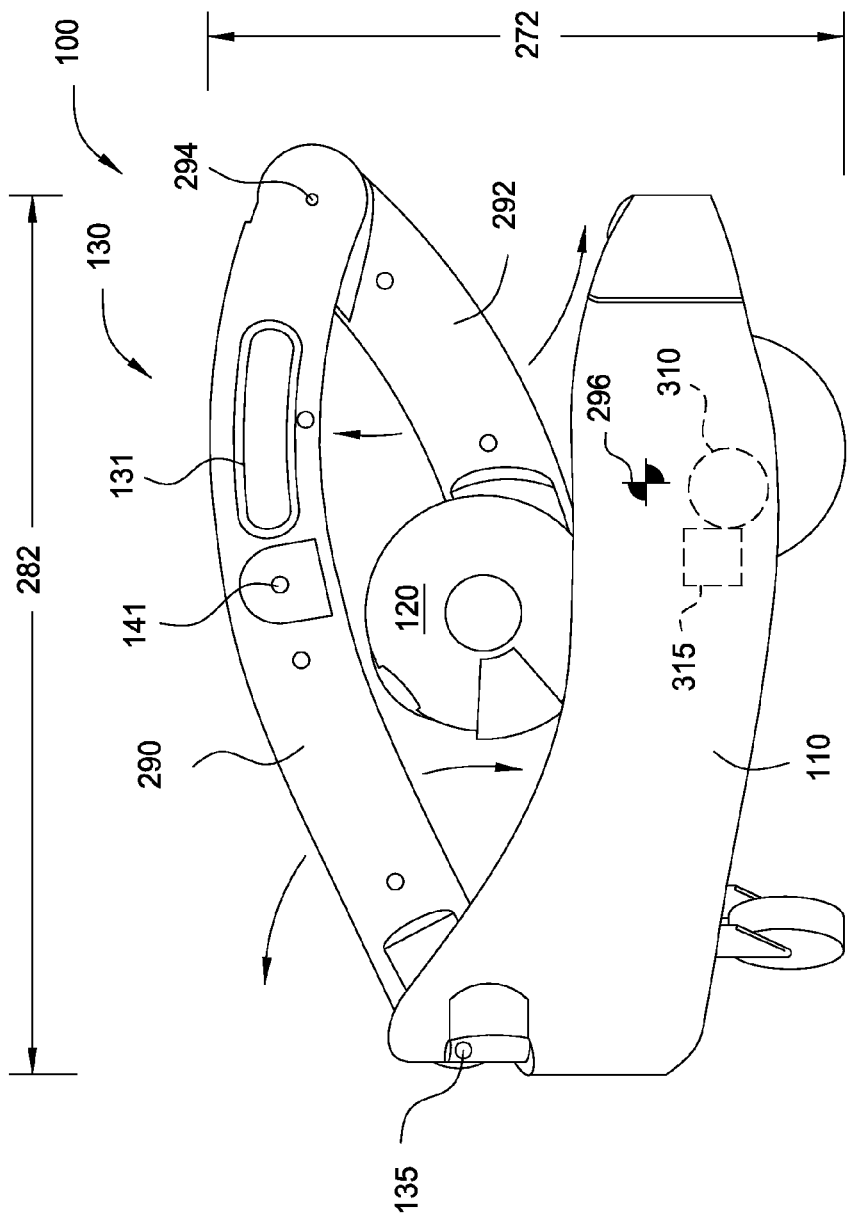
FIG. 2B is an illustration of the robot in the collapsed position, according to a second embodiment.

The robot 100 may have an alternate design for the neck 130 which may compact the robot further and substantially within the footprint of the base 110. FIG. 2B is an illustration of the robot 100 in the collapsed position, according to a second embodiment. The neck 130 includes a middle hinge 294 which divides the neck 130 into a first handle segment 290 and a second segment 292. The middle hinge 294 may be similar in design to bottom hinge 135. The second segment 292 may have an internal connection, wire or other, wherein rotating the first handle segment 290 about the bottom hinge 135 may cause the second segment 292 to rotate in a similar direction about middle hinge 294. Advantageously, the middle hinge 294 may provide a smaller overall length 284 than the original collapsed length 280. The smaller length 182 may expand storage options for the robot 100. Alternately, instead of a middle hinge 294, the neck 130 may be telescoping (Not shown).

A center of gravity (shown at location 296) may be determined from the placement of the various components such as the motor 310, batteries 315, sensor package, etc. The first handle segment 290 may include the handle 131 oriented substantially over the center of gravity (296). The handle 131 location balances the robot 100 when carried by the handle, making lifting and carrying the robot 100 more manageable.

A payload receiving space 125 is defined between the head 120 and the base 110. The payload receiving space 125 is bounded on one side by the neck 130. The payload receiving space 125 provides an area in which a payload, such as but not limited to tools, gear, purchased items, supplies or other items, are carried by the robot 100. The payload may be supported on at least the base 110 or the neck 130 of the robot 100.

The robot 100 is equipped with a container assembly 140 for holding the payload in the payload receiving space 125. The container assembly 140 may be removable from the robot 100. The container assembly 140 may be a rigid or flexible, and have sufficient strength for carrying the payload therein. The container assembly 140 may be supported directly on the base 110. The container assembly 140 may alternatively be supported by the neck 130 in conjunction with or without being supported by the base 110.

Figure 1A:
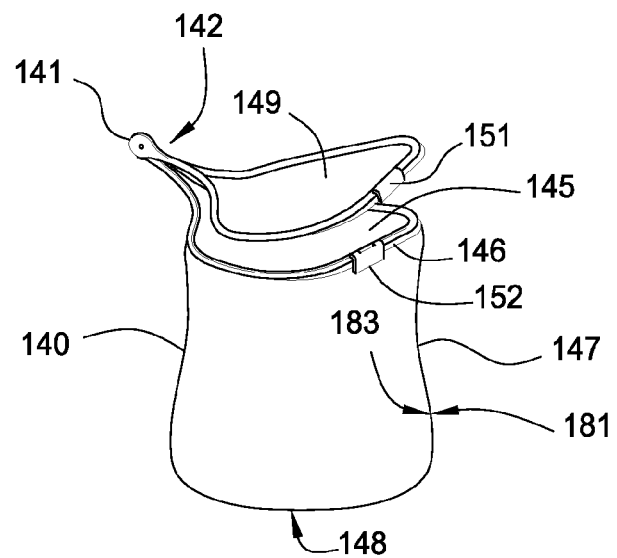
FIG. 1A is an illustration of a container assembly, according to an embodiment.

FIG. 1A is a perspective view of one embodiment of the container assembly 140. The container assembly 140 may be a bag, container, basket and the like, which attaches by a container attachment 141 to the neck 130 of the robot 100. The container attachment 141 may be a fixed fastener, such as a bolt, which permits the container assembly 140 to fold with the robot 100 when the robot 100 is collapsed as shown in FIG. 2a. Alternately, the container attachment 141 may be removable, such as a spring clip, and permits the removal of the container assemble 140 when the robot 100 is collapsed as shown in FIG. 2b. The container assembly 140 may be supported on or over the base 110. The container assembly 140 may include a rim 146, sidewalls 147 and a container bottom 148. The container assembly 140 may optionally have a lid 149 configured to close the container assembly 140 to prevent items from falling out of the container assembly 140 and/or to deter theft. The lid 149 may be attached to the container assembly 140 or be a separate component.

A latching mechanism 151 may also be provided to selectively secure the lid 149 to the container assembly 140 in a closed position. The latching mechanism 151 may engage a receiver 152 to secure the lid 149 to the container assembly 140 in the closed position. The latching mechanism 151 may be coupled to the lid 149, while the receiver 152 may be coupled to one of the sidewall 147 or rim 146 of the container assembly 140, or vice versa. For example, opening the lid 149 may require the presence of a key or key fob to uncouple the latching mechanism 151 from the receiver 152. Alternately, the latching mechanism 151 and receiver 152 may include a mechanical or magnetic latch for securing the lid 149 to the container assembly 140 with minimal resistance.

A lid position sensor (not shown) may be interfaced with the processor 150 to provide an indicator, such as a visual, audible or other alarm, if the lid 149 is opened to allow access to the container assembly 140. Thus, the alarm may be utilized to alert the use of an unauthorized access to the container assembly 140. The alarm may include a key fob or other device to identify the user.

Figure 4:
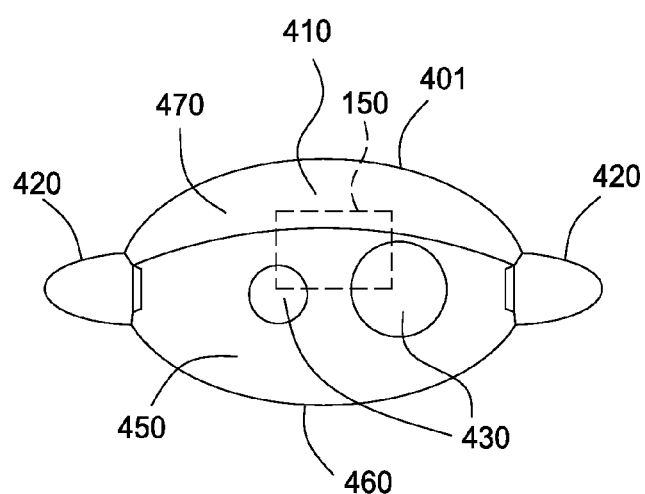
FIG. 4 is an illustration of a head unit for the robot, according to an embodiment.

FIG. 4 is an illustration of the head 120 of the robot 100. The head 120 of the robot 110 may be fixed or pivotally coupled to the neck 130, for example, by the hinge 136. The head 120 may include a power button 410, range finding sensors 420, and optionally eyes 430. In the embodiment depicted in FIG. 4, the head 120 additionally includes a communication transceiver 553, which is interfaced with the processor 150. The communication transceiver 553 may be an RF antenna, Bluetooth antenna or wireless communication interface. The communication transceiver 553 is utilized to pair the robot 100 with the carry sensor 160, thereby pairing the robot 100 with a specific individual user.

The eyes 430 may be located on the front of the head 120. The eyes 430 may be decorative or functional, and contain additional sensors for the robot 100. For example, the eyes 430 may have embedded antennas or other receivers/transmitters. Additionally, the eyes 430 may be configured as a port to provide access between I/O cables and the processor 150. In one embodiment, the eyes 430 are cosmetic and adorn the head 120 to give the robot 100 a more human-like appearance.

In the embodiment depicted in FIG. 4, the power button 410 is configured to superficially resemble a visor. However, the power button 410 may have a substantially different in size, shape and/or location. The power button 410 may be a touch switch (such as temperature sensitive, resistive, capacitive or radio reception), a toggle switch, a push-button switch, a rocker switch or other suitable switch for controlling the on/off or other state of the robot 100. In one embodiment, the power button 410 is a large pressure plate which encompasses the top 401 of the head 120 of the robot 100. In another embodiment, the power button 410 may be a touch switch which changes the state of the robot 100 by a simple touch of a human finger to the top 401 of the head 120 of the robot 100.

The communication transceiver 553 provides a communication pathway between the processor 150 and a remote device, such as the carry sensor 160 (shown as sensor 160 in FIG. 1). The communication transceiver 553 establishes a pairing of the robot to the carry sensor 160, which is carried on the person of the user. The pairing ensures the robot 100 communicates with and follows only the user carrying the carry sensor 160. In one embodiment, the communication transceiver 553 may be a wireless ZigBee® transceiver such as an Atmel® 86RF212, Atmel® 86RF230 or Atmel® 86RF233, among others. Although the communication between the carry sensor 160 is described here using an RF transceiver, other suitable transceivers may be used, such as a serial infrared (IR) wireless transceiver. If the carry sensor 160 is out of range of the communication transceiver 553, the processor 150 will enter a wait state.

The carry sensor 160 may have its own battery power and is not tethered to the robot 100. In one embodiment, the carry sensor 160 may consists of a single RF transmitter. The communication transceiver 553 receives the RF signal from the carry sensor 160. Alternatively, the communication transceiver 553 may provide a signal that enables the carry sensor 160 to provide a return signal.

The range finding sensors 420 are arranged in a laterally spaced-apart relation on the head 130. For example, the range finding sensors 420 may be located at the farthest lateral separation on the longitudinal axis of the head 130. The range finding sensors 420 provide information to the processor 150 for determining a range or distance from an object. In one embodiment, the range finding sensors 420 provide information for determining the distance from the user carrying the carry sensor 160. The type of sensor useable for the range finding sensor 420 may be selected pursuant to the desired maximum distance that the sensor can operate, or the nominal range. The range finding sensors 420 may be ultrasonic sensors, Sonar, IR sensors, RF sensors, laser, photocell, RADAR, or other suitable range finding sensor. In one embodiment, the range finding sensors 420 may consist of dual ultrasonic receivers, one at each end of the points of the head 120. The dual ultrasonic receivers may operate off of a single clock of the processor 150 or other source to ensure appropriate synchronization and reliable range determination.

The range finding sensors 420 may enter a receive mode and communicate a ZigBee® signal. The range finding sensors 420 remain in receive mode until they either receive a valid signal or time out. The range finding sensors 420 may calculate the range to the paired carry sensor 160. The range finding sensor 420 may have a range of about 0.1 m to about 5.0 m. In one embodiment, the range finding sensor 420 may be an ultrasonic sensor with a range of about 3.0 m.

The processor 150 communicates with the various components, such as the sensors, alarms and motors, of the robot 100. As discussed above, the processor 150 may be disposed within the head 120, base 110 or other suitable location. Alternately, the processor 150 may be external to the robot 100. The processor 150 may include a CPU (central processing unit), a NIC (network interface card), an input/output (I/O) card, memory, storage, connected by a bus. Additionally, the processor 150 may include an embedded RF receiver/transmitter and/or a Bluetooth® antenna. The processor 150 is responsible for signal processing and sensor control, motor control and status/state processing. In one embodiment, the processor 150 is wired to the various components in the robot 100 to control the functions of the robot. In another embodiment, the processor 150 communicates via a wireless protocol to the various components of the robot. In yet another embodiment, components of the robot 100 communicate via an encrypted signal from a low-power digital radio with the processor 150.

The processor 150 is representative of a variety of computing devices capable of providing instructions and control to the robot 100. The processor 150 may be a micro controller, a programmable logic controller, single board computers, a distributed control system (decentralized processor 150), remote terminal units or other suitable computing devices. In one embodiment, the processor 150 may be a microcontroller, such as an Atmel® AVR® processor w/ Integrated ZigBee® (processor).

Figure 5:
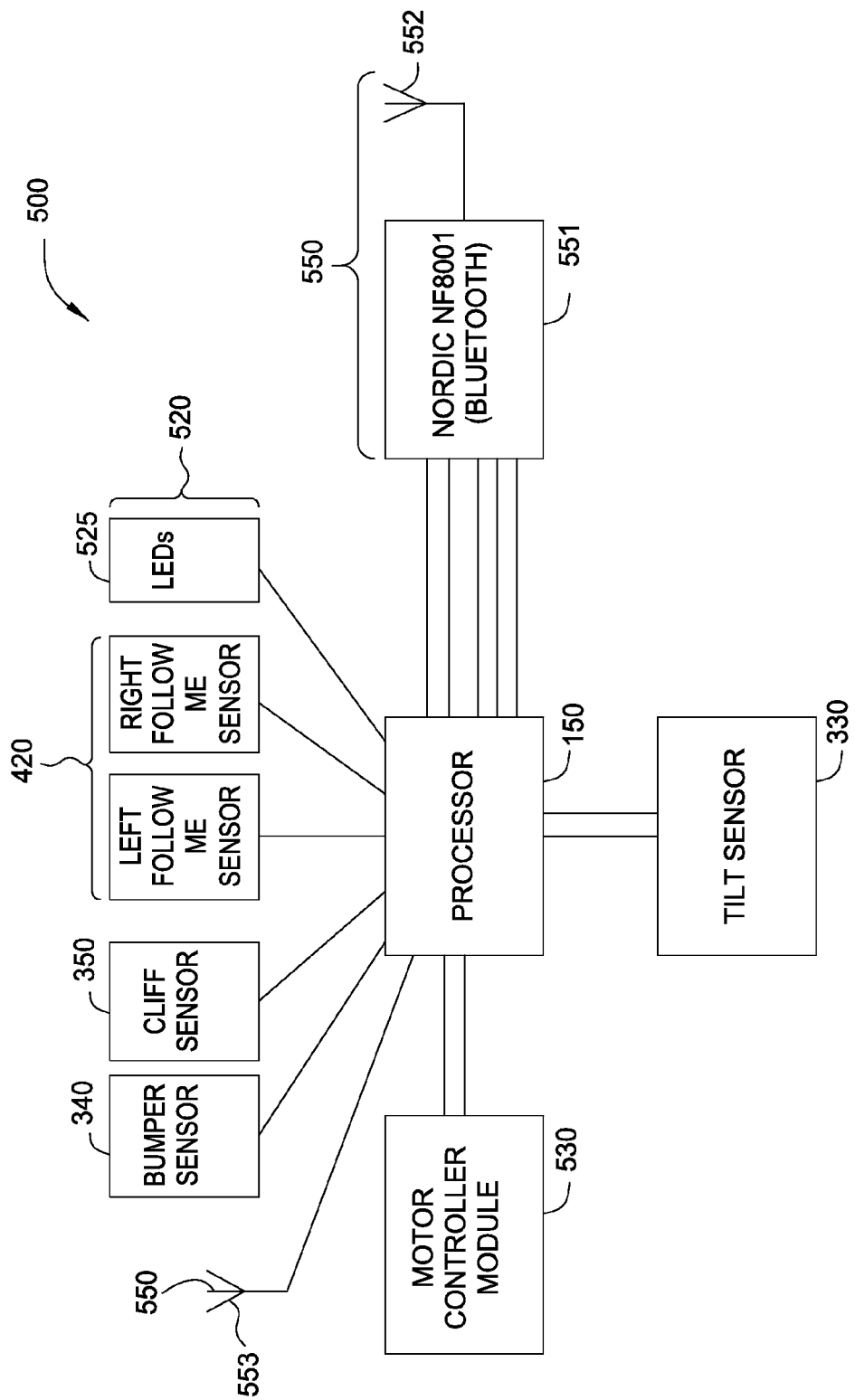
FIG. 5 is a schematic of a hardware design and interfaces for the robot, according to an embodiment.

FIG. 5 is a schematic diagram of the hardware design and interfaces for the robot 100, according to an embodiment. The processor 150 may be coupled to and communicate with a sensor package 520, a motor controller module 530, and a communication package 550. The robot 100 hardware may include commercial or proprietary components.

The sensor package 520 may include the bump sensor 340, the tilt sensor 330 and the cliff sensor 350, and the spaced-apart range finding sensors 420, among others. The sensor package 520 may additionally include LEDs 525. The LEDs 525 may be utilized to provide an indicator of the state of the sensors comprising the sensor package 520. The sensor package 520 may communicate with the processor 150 via a wired TCP/IP or other suitable protocol. In one embodiment, the sensor package 520 provides information regarding the environment or state of the robot 100 to the processor 150. The information is processed by the processor 150, and when appropriate, the processor 150 will provide commands or change the state of the robot 100.

The motor controller module 530 receives instructions from the processor 150 to control the motors propelling the drive wheels of the robot, and thus the motion of the robot 100. The communication may be through a serial connection, a wireless connection, or other suitable connection for communicating information between the motor controller 530 and the processor 150. One or more motor controllers 530 may provide control to one or more motors. In one embodiment, the motor controller 530 manages the motor 312 directly attached to the drive wheel 320 (as shown in FIG. 3). In another embodiment, the motor controller 530, such as a Sabertooth Dual Motor Controller, controls both the motors 311, 312 to turn the drive wheels 321, 320. Such a configuration of a dual motor controller may save weight and, thus make lifting the robot easier.

The communication package 550 may include the communication transceiver 553, one or more Bluetooth™ 555 and/or RF transceivers. The Bluetooth™ 555 may include an antenna 552 for low power communication to remote computing devices. The remote computing device may be used to provide configuration and control information to the robot 100. The Bluetooth™ 555 may be integrated into the processor 150, such as an integrated chip. Alternatively, the Bluetooth™ 555 may be included as an external device which communicates to the processor 150 via a wired protocol or I/O connection. In one embodiment, the Bluetooth™ 555 is a Nordic nrf8001 integrated chip. Although the communication between the robot 100 and the remote computing device is shown via a Bluetooth™ protocol, it is envisioned to include any protocol suitable for remotely controlling the robot 100 by a remote computing device.

Figure 6:
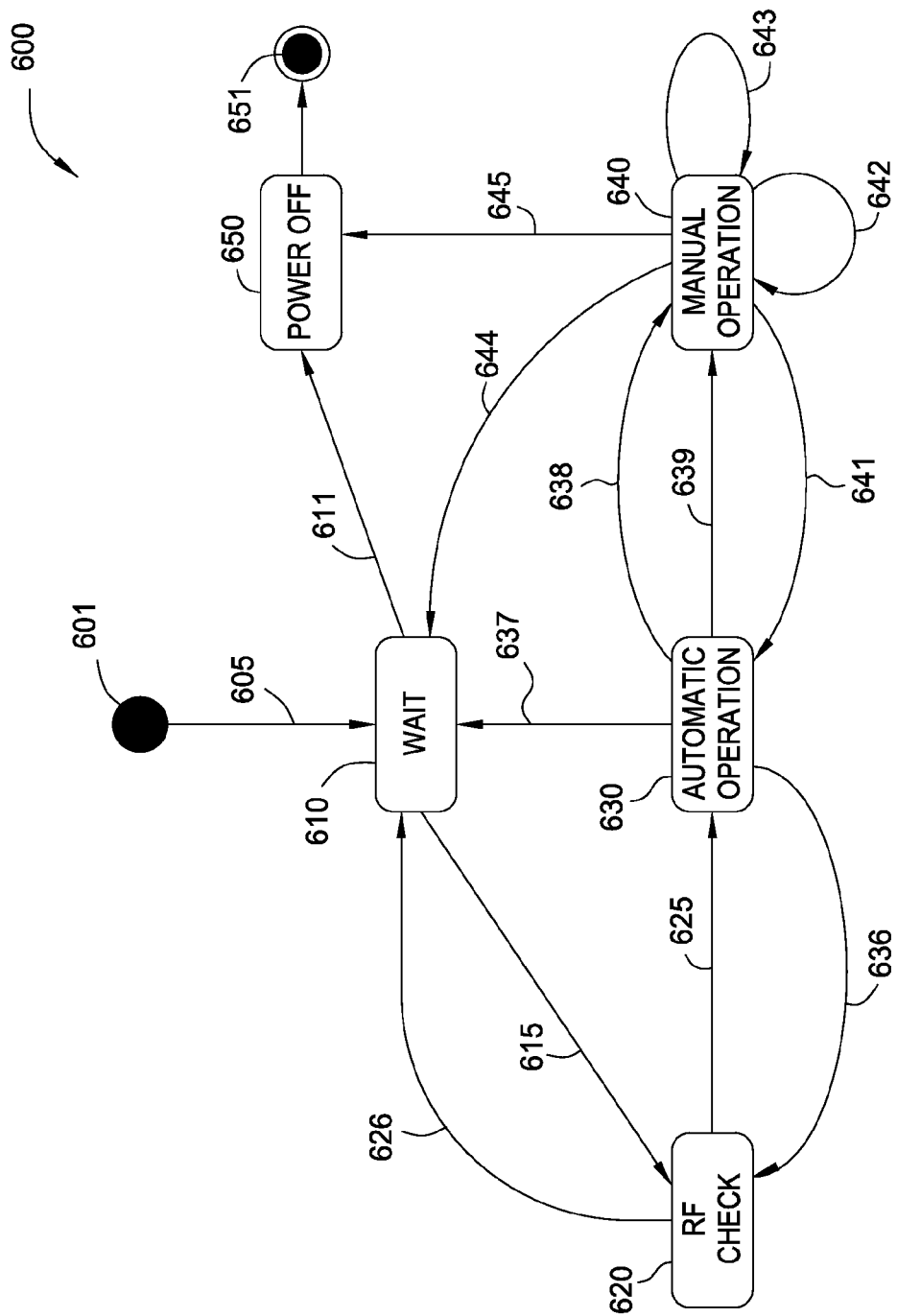
FIG. 6 is a state diagram for the robot, according to an embodiment.

FIG. 6 is a state diagram 600 provided to assist describing exemplary behavior of a robot, such as the robot 100 shown in FIG. 1. The robot behavior is predicated on a set of programmed instructions provided in the robot hardware. In one embodiment, the instructions may reside in persistent memory, such as firmware. It should be understood to one knowledgeable in the art that although the state diagram 600 depicts a finite number of states, this convention is merely a reasonable abstraction, or representation, for the behavior of the robot. The state diagram 600 begins at an initial state 601. The initial state 601 may transition to a wait state 610 by powering on the robot 100, as shown by arrow 605.

In one embodiment, the robot 100 may awake from a wait state by an actuation of the power button 410. In another embodiment, the robot 100 may enter into a wait state by actuation of the power button 410. In another embodiment, the robot 100 may turn off by actuation of the power button 410. Selection between the states of the robot 100 may be achieved by the number and/or duration of the actuation of the power button 410. For example, quickly pressing the power button 410 may sequence the user through state choices, the selection of which may be made by pressing the power button 410 for a longer duration, such as about 5 seconds or more seconds.

In the wait state 610, the processor 150 does not provide instructions to the drive unit 310 to move the robot 100, in other words, the robot 100 remains motionless if stopped, or comes to a stop if moving upon entering the wait state 601. In the wait state 610, the processor 150 attempts to establish or reestablish a communication link-up 615 with the carry sensor 160 carried by the user, for example an RF link utilizing the communication transceiver 553. The RF link-up 615 provides the connection for pairing the carry sensor 160 carried by the user in a RF check state 620. The RF check state 620 pairs the carry sensor 160, and thus the user in possession of the carry sensor 160, to the robot. In this manner, the robot 100 may communicate with, trust and follow the carry sensor 160 carried by the user.

A clock may provide time for establishing timeouts for various state transitions and loss of signal. For example, failure for the wait state 610 to transition 615, by the RF link-up, to the RF check state 620 may eventually result in an inactivity timeout 611. The inactivity timeout 611 may transition the robot 100 to a power off state 650. Alternatively, the power off state 650 may be a sleep state, or a hibernation state, wherein the sensor packages may be powered down but one or more of the transceivers of the communication package 550 is still available for communication between the processor 150 and external devices and/or the carry sensor 160. Timing out the RF signal transitions the processor 150 of the robot 100 back to the wait state 610, as shown by arrows 626, 637, and 644.

Upon establishing pairing at the RF check state 620, the sensor package 520 is utilized to detect obstacles between the carry sensor 160 and robot 100. Reception of the ultrasonic signal transitions the robot 100 to an autonomous operation state 630, as shown by arrow 625. In the autonomous operation state 630, the robot 100 follows the paired user at a prescribed distance while monitoring the surrounding environment for obstacles. The ultrasonic sensors provide a distance to the user (i.e., to the carry sensor 160). The robot follows the user as long as the user is within a specified configurable range. For example, the robot may follow the user if the user is no greater than 3.0 m away and no less than 0.1 m away. The robot 100 may pause, i.e., enter the wait state 610, when the communication link between the robot 100 and carry sensor 160 is broken. For instance, the communication link may be broken when the user turns in a manner that the user's body obscures the communication signal between the carry device and the robot. Such a situation is useful when the user wishes to approach and interface with the robot, such as to turn the robot off or to place an item in the container assembly 140, thus preventing the robot from trying to maintain a minimum distance between the carry sensor and robot which would cause the robot to move away from the user.

An ultrasonic signal timeout, for lack of receiving a reply after transmitting an ultrasonic signal, transitions 636 the robot back to the RF check state 620. The robot may verify the RF link with the remote device in the RF check state 620 while the robot is paused. Upon reception of the ultrasonic signal, the robot transitions 625 back to the autonomous operation state 630. In one embodiment, the autonomous operation state 630 may include the robot following the user at a prescribed distance.

At least two different approaches may transition the autonomous operation state 630 to the manual operation state 640. The robot in the autonomous operation state 630 may detect an obstacle and transition 638 to the manual operation state 640. Alternatively, the robot in the autonomous operation state 630 may be issued a pause command and transition 638 to the manual operation state 640. It is envisioned that other operations, signals and or messages may also transition the robot to the manual operation state 640.

The manual operation state 640 moves control of the robot to the user. The control may be via a Bluetooth connection to a small computing device, a voice recognition system or other means for transmitting instructions to the robot platform. The manual operation state 640 allows the user to clear obstacles 642 by issuing drive commands 643. The user may issue a follow command from the manual operation state 640 to transition 641 to the autonomous operation state 630.

The manual operation state 640 may additionally transition 645 to the power off state 650 due to inactivity. A timeout may be configured such that failure to interact with the robot for more than a specified period of time causes the robot to go into the power off state 650 in order to conserve energy. Alternatively, the inactivity may transition 645 the robot into a hibernation state, as discussed earlier.

In the power off state 650, the platform prepares for shutdown prior to transitioning 655 to a final state 660. This may include notifying the user prior to clearing memory and powering down the sensors, motors and other devices that are included in the robot platform.

Returning back to FIG. 5, the software for the robot includes firmware run in the hardware as well as user applications for personal computing devices, such as smart phones and tablets. The software run as user applications interface with the robot to register the robot to a user; control settings, parameters or upgrades in the firmware; and provides direct control over the operation of the robot. In one embodiment, the user application may be installed on a personal computing device, such as a smart phone running an ANDROID® or an iOS® operating system.

Figure 7:
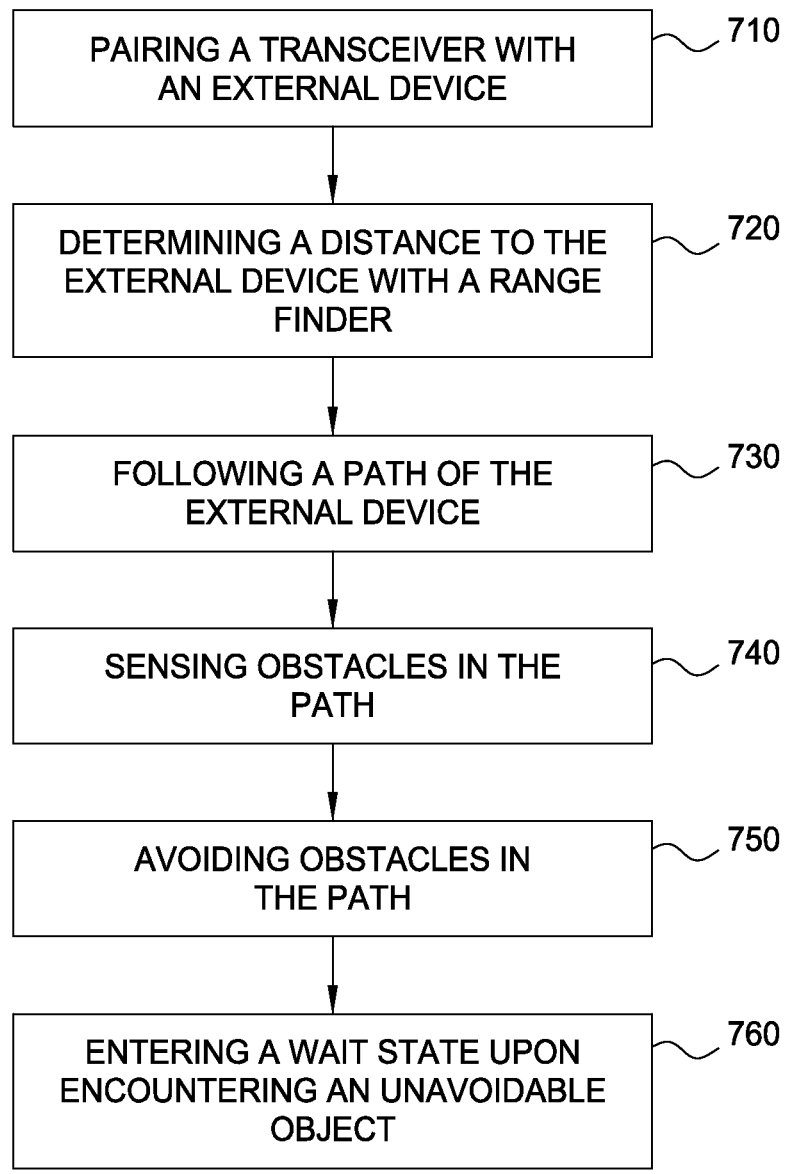
FIG. 7 is a method flow diagram for the robot navigating autonomously.

FIG. 7 is a flow diagram for a method 700 for a robot navigating autonomously. The method 700 begins at step 710 by pairing the communication transceiver 553 with the carry sensor 160.

In step 720, a distance between the communication transceiver 553 and the carry sensor 160 is determined by a range finder, such as the range finding sensors 420. An internal clock of the processor 150 or other source provides timing for the ultrasonic signal provided by the range finding sensors 420 and used by the processor 150 for calculating the distance between the communication transceiver 553 and the carry sensor 160. Timing of the signal allows for the distance to be calculated through triangulation. The clock may also be used as for determining when to generate a signal timeout.

In step 730, the processor 150 determines if the distance determined at step 720 is outside of a configurable distance window. If so, the processor 150 provides appropriate instructions to the motor controller module 530 required to follow the path of the carry sensor 160 while maintaining the robot 100 within the configurable distance window. Thus, the robot 100 stays within the configurable distance window behind the carry sensor 160 and user as the user moves about the environment, such as a store or sidewalk. The distance window may be configurable within a desired range, such as between about 0.1 m to about 3.0 m. The motor controller module 530 may adjust the travel speed of the robot 100 in order to stay within the distance window. For example, the robot 100 may slow down as the follow distance becomes less than a first predefined distance, such as 1 meters. Additionally, the robot 100 may increase speed when the follow distance is greater than a second predefined distance, such as 2 meters. In another embodiment, the travel speed of the robot 100 may be proportionally related to the following distance. In yet another embodiment, the travel speed of the robot may be constant and independent of the distance between the communication transceiver 553 and the carry sensor 160.

In step 740, the robot 100 senses obstacles in the path followed by the robot. If the robot senses gaps in the travel surface of the path, unevenness of the travel surface of the path, and/or barriers in the path which the robot may collide with, the processor 150 may cause the robot 100 to enter an avoidance state or the wait state.

In step 750, the robot 100 avoids obstacles detected, i.e., sensed using the sensor package 520, in the path followed by the robot. Upon sensing an obstacle outside of acceptable parameter, such as a gap too wide to cross or an object upwardly projecting from the floor greater than a predefined amount, the processor 150 determines if the robot 100 should enter the wait state or avoidance state. In the avoidance state, the processor 150 provides appropriate instructions to the motor controller module 530 so that the robot 100 may follow the path of the carry sensor 160 while maintaining the robot 100 within the configurable distance window and while navigating clear of the obstacle. Avoiding an obstacle may include, reversing direction, turning, stopping or other suitable course of action which prevents damage to the robot 100 or damage to the surrounding environment. For example, if the bump sensor detects a small upwardly projecting object in the floor greater than the predefined amount, the processor 150 will determine an alternate route and provide instructions to the motor controller module 530 so that the robot 100 may navigate around the object.

In step 760, the robot 100 detects an obstacle, i.e., sensed using the sensor package 520, in the path followed by the robot which cannot be avoided in the avoidance state. For example, the processor 150 of the robot 100 may determine in response to information provided by the sensor package 520 that the only path toward the carry sensor 160 carried by the use is through or across an obstacle that the robot 100 cannot safely traverse. Such an obstacle may be steps, curbs, tight or narrow spaces, or people, among other obstacles. In this event, the robot 100 may enter the wait state. Optionally, the processor 150 of the robot 100 may notify the user upon switching to the wait state, and/or of the reason for entering the wait state. In this manner, the user may manually navigate the robot clear the of obstacles, choose an alternate path, or determine another suitable solution. For instance, the user may have the robot wait at the bottom of a flight of steps while briefly looking at something located on the floor at the top of the steps. Alternately, the user may choose to navigate the robot manually. Manual navigation of the robot 100 with a computing device is discussed further with reference to FIGS. 8A-8E below.

FIGS. 8A-8E illustrate various screens of a computing device 800 provided as an example of a user interface for operating the robot. The computing device 800 includes or can access a software application designed to allow the user an easy means of remotely and wirelessly interacting with the robot 100. The computing device 800 may include a smart phone, a smart watch, a tablet or other suitable interactive processing device. The computing device 800 may communicate with the robot 100 via radio waves or light waves using a wireless networking protocol. The wireless networking protocol may include Bluetooth™, IEEE 802.11x, ZigBee or other suitable communication protocol. In one embodiment, a smart phone makes a Bluetooth™ connection to the robot for communicating directions.

The software application on the external computing device 800 is a powerful supplemental feature which enables greater utility of the robot 100. However, the software application is not required to use the basic functionality of the robot 100. The software application may allow the user to manually control the robot; stop the robot; view the robot status and alerts; adjust robot settings; and provide firmware upgrades and product registration; among other operations. The software application allows a remote user to manage at least one or more of the above mentioned functions through a simple user interface. In one embodiment, the software application is registered to one or more robots.

Figure 8C:
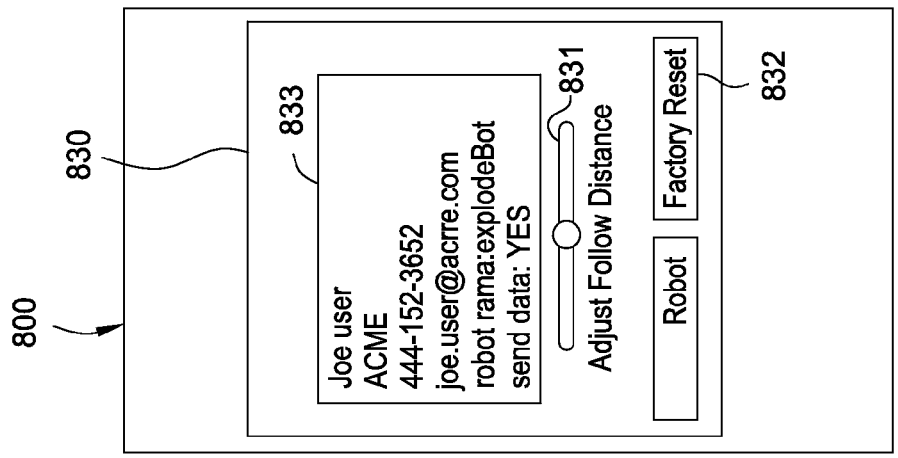
Figure 8B:
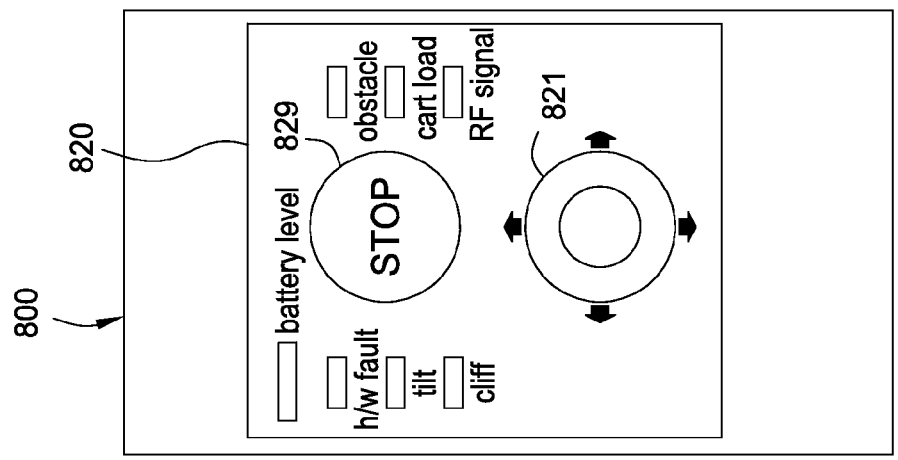
Figure 8A:
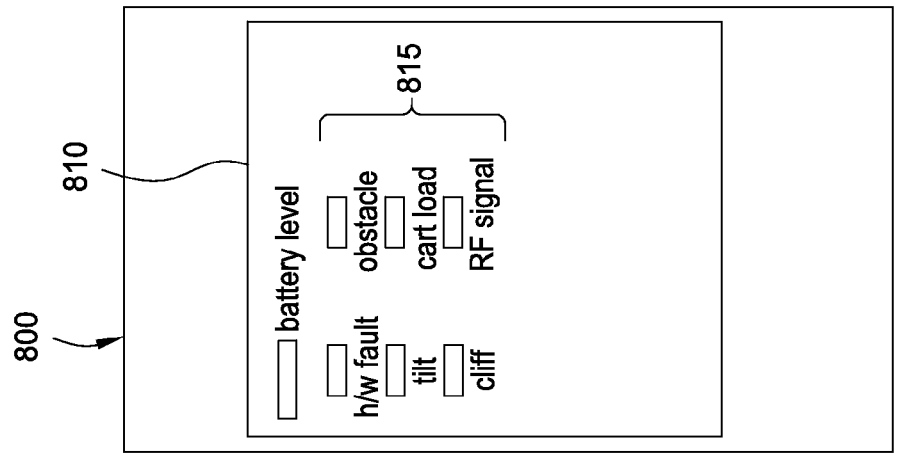

Referring first to FIG. 8A, the external computing device 800 is shown displaying a status screen 810. The status screen 810 includes information relating to the operation of the robot 100. For example, the status screen 810 may display status indicators 815, some of which may include battery charge level, the status of the communication link with the processor 150, the status of the sensor used in for navigating of the robot, among others.

FIG. 8B illustrates an exemplary monitoring screen 820 displayed by the external computing device 800. The monitoring screen 820 includes elements of the status screen 810, and additionally includes a user interface for controlling certain aspects of the robot 100. For example, the monitoring screen 820 include an emergency stop button 829 which the user may activate to stop the robot 100. In another example, the monitoring screen 820 include a virtual joystick 821 which the user may interface with to control the motion of robot 100.

FIG. 8C illustrates an exemplary configuration screen 830 displayed by the external computing device 800. The configuration screen 830 is provided to adjust configurable parameters in the robot 100. For example, the configurable distance window that sets the following distance range may be selected using a slider bar 831. Other configurable parameters may be typed in or utilize the same or different slider bar or input device. In one embodiment, the configuration screen 830 may also display registration information 833 unique to the robot 100, the carry sensor 160, and the user. A factory reset button 832 may be provided for setting all the robot parameters back to a factory determined setting in which the performance of the robot is known to work.

FIG. 8D illustrates an exemplary control screen 860 displayed by the external computing device 800. The control screen 860 may display the current mode of in which the robot is operating, as illustrated by reference numeral 863. For example, the control screen 860 may illuminate an icon such as "FOLLOW" to indicate that the robot 100 is in an autonomous mode of operation, while illumination of an icon such as "DRIVE" may indicate that the robot 100 is in a manual mode of operation. The control screen 860 may display an identification 864 of the paired device. The identification 864 may be a MAC address, IP address, or other suitable addressable ID. The control screen 860 may provide a means for remotely controlling the movement of the robot 100. The control screen 860 may override the motor controller and sensor package. The control screen 860 may provide keypad 861 for controlling the movement of the robot 100. In one embodiment, the control screen 860 provides complete control over the robot overriding the sensors and warnings. In another embodiment, the sensor package of the robot remains active when the robot is being controlled from the external computing device 800. In this manner, damage to the robot 100 and the surrounding environment caused by the robot bumping, falling or tilting may be mitigated. As discussed above, the motion of the robot may also be controlled from the monitoring screen 820.

FIG. 8E illustrates an exemplary custom configured screen 850 displayed by the external computing device 800. The custom configured screen 850 may display the any user configured information available to the external computing device 800. For example, the user may configure the screen 850 to display the 863, 864, 855, 875 829 and 821.

The screens 810, 820, 830, 850, 860 demonstrate a limited sample of the functionality for the software application on the computing device 800. The software application may configure each parameter for each sensor and monitor the sensors as well. The software application may additionally control aspects of the robot other than those depicted in FIGS. 8A-8E. For example, the software may be used to lock the lid on the basket/container to prevent theft. The software may monitor attempts to hack into and steal the robot. The robot may be equipped with a location device, such as a GPS, which may display the location of the robot on a map in the client software. As shown, the software provides a limitless interface to the robot for ease of configurability and operation.

Descriptions in this disclosure relate to the robot platform and the methods for autonomous navigation of the robot platform. The robot links to a device (e.g., carry sensor) carried by an user, thereby pairing a unique user with a specific robot. The robot may use a range finder to determine a distance to and follow the user while maintaining a predefined distance from the user. While following the user, a sensor package containing a bump, tilt and cliff sensors, ensure the robot navigation is unimpeded by avoiding obstacles. Therefore, the robot can provide hand and attention free assistance to the user.

While the foregoing is directed to the illustrative embodiment of the present invention, other and further embodiments of the invention may be devised without departing from the basic scope thereof, and the scope thereof is determined by the claims that follow.

What is claimed is:

1. A self-propelled robot comprising:
 a base comprising:
  a front forward facing a primary forward direction of travel;
  drive wheels coupled to the body proximate the front of the base and orthogonal to the primary forward direction of travel; and
  at least one drive motor coupled to the drive wheels operable to steer and propel the base across a surface;
 a head comprising:
  a communication transceiver configured to communicate with a carry sensor that is remote from the robot; and
  at least two laterally spaced-apart ultrasonic range finding sensors, wherein the ultrasonic range finding sensors are directionally forward facing passive receivers relative to the primary direction of travel and in a parallel alignment to the drive wheels, the ultrasonic range finding sensors configured to locate and track the carry sensor in two-dimensional space;
 a neck connecting the head to the base, the neck movable to space the head away from the base when in an erect position, the neck movable to space the head proximate the base when in a collapsed position;
 a container assembly supported between the head and the base; and
 a processor in communication with the ultrasonic range finding sensor and the drive motor, the processor configured to, when communication transceiver is in communication with the carry sensor and the ultrasonic range finding sensor receives an ultrasonic signal from the carry sensor, operate the drive motor to maintain the ultrasonic range finding sensors oriented forward facing in the direction of travel toward the carry sensor and maintain a predefined distance between the ultrasonic range finding sensor and the carry sensor.

2. The robot of claim 1, wherein the neck is coupled to a rear side of the base, the neck having a curvature placing the head substantially over a front portion of the base.

3. The robot of claim 1, wherein the container assembly comprises:
 a lid movable between an open position and a closed position.

4. The robot of claim 1 further comprising:
 a tilt sensor, a bump sensor, and a cliff sensor, the sensors interfaced with the processor.

5. The robot of claim 1, wherein the neck further comprises:
 one or more handles.

6. The robot of claim 1, wherein the range finding sensors have a range between about 0.1 meter to about 5.0 meters.

7. The robot of claim 1, wherein the communication transceiver is a radio frequency transceiver.

8. The robot of claim 7, wherein the carry sensor is a radio frequency transceiver and an ultrasonic transmitter.

9. The robot of claim 8, wherein the communication transceiver pairs with the carry sensor.

10. The robot of claim 9, wherein the range finding sensors is configured to calculate a line of sight distance to the paired carry sensor.

11. The robot of claim 9, wherein the processor is configured to stop the drive motor when the calculated range to the paired carry sensor exceeds a threshold value.

12. The robot of claim 1, wherein the ultrasonic range finding sensors are located at the farthest lateral separation on a longitudinal axis of the head.

13. The robot of claim 12, wherein the processor includes:
an internal clock for providing timing for an ultrasonic signal from the range finding sensors for calculating the distance between the ultrasonic sensor and the carry sensor.

14. The robot of claim 12, wherein the carry sensors has an ultrasonic transmitter.

15. The robot of claim 14, wherein the range finding sensors may enter a receive mode after communicating to the carry sensor and remain in the receive mode until the range finding sensors either receives the ultrasonic signal from the carry sensor or times out.

16. The robot of claim 15, wherein the time out stops the motor and transitions the processor into a wait state.

17. A self-propelled robot comprising:
a base comprising:
a front which faces a primary forward direction of travel;
drive wheels coupled to the body proximate the front of the base and aligned with the primary forward direction of travel; and
at least one drive motor coupled to the drive wheels operable to steer and propel the base across a surface;
a head having at least two laterally spaced-apart forward facing ultrasonic range finding sensors relative to the primary direction of travel and in a parallel alignment with the drive wheels, the ultrasonic range finding sensors configured to locate and track a carry sensor in two-dimensional space, wherein the ultrasonic range finding sensors are passive receivers and configured to communicate with the carry sensor that is remote from the robot;
a neck connecting the head to the base, the neck movable to space the head away from the base when in an erect position, the neck movable to space the head proximate the base when in a collapsed position;
at least one drive motor operable to propel the base across a surface;
a radio frequency communication transceiver configured to communicate and pair with the carry sensor having an ultrasonic transmitter;
a container assembly supported between the head and the base; and
a processor in communication with the ultrasonic range finding sensor, the processor configured to, when communication transceiver is paired with the carry sensor and the ultrasonic range finding sensors receives an ultrasonic signal from the carry sensor, operate the drive motor to maintain the ultrasonic range finding sensors oriented forward facing in the direction of travel toward the carry sensor and maintain a predefined distance between the ultrasonic range finding sensor and the carry sensor.

* * * * *